(12) United States Patent
Prozorovska

(10) Patent No.: US 11,821,112 B1
(45) Date of Patent: Nov. 21, 2023

(54) POLYMER FIBERS AND PARTICLES PRODUCED BY ELECTROSPINNING OR ELECTROSPRAYING

(71) Applicant: SCALE HOLDINGS LLC, Wilmington, DE (US)

(72) Inventor: Liudmyla Prozorovska, Waynesboro, VA (US)

(73) Assignee: Scale Holdings LLC, Wilmington, DE (US)

( * ) Notice: Subject to any disclaimer, the term of this patent is extended or adjusted under 35 U.S.C. 154(b) by 0 days.

(21) Appl. No.: 17/971,412

(22) Filed: Oct. 21, 2022

(51) Int. Cl.

| | |
|---|---|
| *D01D 5/38* | (2006.01) |
| *D01D 5/00* | (2006.01) |
| *D01D 1/02* | (2006.01) |
| *C08G 61/06* | (2006.01) |
| *C08F 4/80* | (2006.01) |
| *B01J 31/22* | (2006.01) |
| *D01D 1/06* | (2006.01) |

(52) U.S. Cl.
CPC ........ *D01D 5/0046* (2013.01); *B01J 31/2269* (2013.01); *D01D 1/065* (2013.01); *D01D 5/0069* (2013.01); *D01D 5/38* (2013.01); *B01J 2231/54* (2013.01); *B01J 2531/004* (2013.01); *B01J 2531/821* (2013.01); *B01J 2531/825* (2013.01); *B01J 2531/90* (2013.01); *C08F 4/80* (2013.01); *C08G 61/06* (2013.01); *D01D 1/02* (2013.01); *D01D 5/003* (2013.01); *D01D 5/0053* (2013.01)

(58) Field of Classification Search
CPC ........ D01D 1/02; D01D 1/065; D01D 5/0053; D01D 5/38; D01F 6/96; C08G 61/06; C08F 4/80
See application file for complete search history.

(56) References Cited

U.S. PATENT DOCUMENTS

| | | |
|---|---|---|
| 8,088,323 B2 | 1/2012 | Hellring et al. |
| 9,725,827 B2 | 8/2017 | Daniel et al. |
| 10,422,053 B2 * | 9/2019 | Papila ........................ D01F 6/36 |

FOREIGN PATENT DOCUMENTS

CN             113481639 A   * 10/2021   ............... D01F 6/60

OTHER PUBLICATIONS

CN 113481639 A (Oct. 8, 2021); machine translation. (Year: 2021).*
Xue, J.; Wu, T.; Dai, Y.; Xia, Y. Electrospinning and Electrospun Nanofibers: Methods, Materials, and Applications, Chem. Rev. 2019, 119, 5298-5415. (Year: 2019).*
Qin, X.; Subianto, S. Chapter 17 "Electrospun nanofibers for filtration applications" in Electrospun Nanofibers. Woodhead Publishing Series in Textiles, 2017, p. 449-466. (Year: 2017).*

(Continued)

*Primary Examiner* — Rip A Lee
(74) *Attorney, Agent, or Firm* — McAndrews, Held & Malloy, Ltd.

(57) ABSTRACT

A method of producing polymer fibers and/or particles by direct polymerization of monomers without use of any external high energy sources (such as heat or UV) is described. The method may be used to fabricate polymer fibers, fiber mats, 3D polymer fiber structures, and polymer nano- and microparticles. Polymer fibers may be used to create fiber mats which can be utilized in a variety of applications.

20 Claims, 6 Drawing Sheets

(56) References Cited

OTHER PUBLICATIONS

Qin, X. Chapter 3 "Coaxial electrospinning of nanofibers" in Electrospun Nanofibers. Woodhead Publishing Series in Textiles, 2017, p. 41-71. (Year: 2017).*
Chen, Y.; Tan, G.Z.; Zhou, Y. Polymers 2021, 13, 3650. (Year: 2021).*
Yang, X.; Wang, J.; Guo, H.; Liu, L.; Xu, W.; Duan, G. e-Polymers 2020, 20, 682-712. (Year: 2020).*
Blachowicz, T.; Ehrmann, A. Materials 2020, 13, 152. (Year: 2020).*
Huang, Y.-J.; Huang, C.-L.; Lai, R.-Y.; Zhuang, C.-H.; Chiu, W.-H.; Lee, K.-M. Polymers 2021, 13, 4246. (Year: 2021).*
Chen, D.; Miao, Y.-E.; Liu, T. ACS Appl. Mater. Interfaces 2013, 5, 1206-1212. (Year: 2013).*
Srivastava, Y.; Losceratales, I.; Marquez, M.; Thorsen, T. Microfluid Nanofluid, Springer-Verlag 2007; DOI 10.1007/s10404-007-0177-0. (Year: 2007).*
Huang, H.; Song, Y.; Zhang, Y.; Li, Y.; Li, J.; Lu, X.; Wang, C. J. Agric. Food Chem. 2022, 70, 1391-1409. (Year: 2022).*
Asano, N.; Sugihara, S.; Suye, S.; Fujita, S. ACS Omega 2022, 7, 19997-20005. (Year: 2022).*
Lu, P.; Murray, S.; Zhu, M. Chapter 23 "Electrospun Nanofibers for Catalysts" in Electrospinning: Nanofabrication and Applications, Elsevier 2019, p. 695-717. (Year: 2019).*
Pintauro, P.; Wycisk, R.; Mondal, A.N.; Waugh, J.; Liu, G.; Nanda, J.; Faguy, P. "High-Performance Li-Ion Batery Anodes from Electrospun Nanoparticle/Conducting Polymer Nanofibers" DOE-EERE Project DE-EE0007215 Oct. 1, 2015-Sep. 30, 2019. (Year: 2019).*
Xue, J. et al., Electrospinning and Electrospun Nanofibers: Methods, Materials, and Applications, Chemical Reviews, 2019, vol. 119 (8), pp. 5298-5415.
Peng, N. et al., Evolution of Polymeric Hollow Fibers as Sustainable Technologies: Past, Present, and Future, Progress in Polymer Science, Oct. 2012, vol. 37 (10), pp. 1401-1424.
Seehof, N. et al., Ring-Opening Olefin Metathesis Polymerization of Fluoralkyl-Substituted Polycyclic Olefins, Die Makromolekulare Chem. Rapid Communications, 1991, vol. 12 (2), pp. 107-112.
Deng, X. et al., Metal Chelating Polymer Thin Films by Surface-Initiated ROMP and Modification, Journal of Physical Chemistry C, 2019, vol. 123, pp. 23511-23519.
Bielawski, C. et al., Living Ring-Opening Matathesis Polymerization, Progress in Polymer Science (Oxford), 2007, vol. 32 (1), pp. 1-29.
Faulkner, C. et al., Surface-Initiated Polymerization of 5-(Perfluoro-n-Alkyl) Norbornenes from Gold Substrates,n Macromolecules, 2010, vol. 43 (3), pp. 1203-1209.
Leitgeb, A. et al., The ROMP Toolbox Upgraded, Polymer (Guildf), 2010, vol. 51 (14), pp. 2927-2946.
Rolfe, A. et al., High-Load, Hybrid Si-ROMP Reagents, Organic Letters, 2011, vol. 13 (1), pp. 4-7.
Seehof, N. et al., Transition Metal Catalysed Metathesis Polymerizations of Partially Fluorinated Norbornene Derivatives, Journal of Molecular Catalysis, 1992, vol. 76 (1-3), pp. 53-63.
Bellan, L. et al., Polyl(dicyclopentadiene) Submicron Fibers Produced by Electrospinning, Macromol Rapid Commun., 2006, vol. 27 (7), pp. 511-515.
Vougioukalakis, G.C. et al., Ruthenium-Based Heterocyclic Carbene-Coordinated Olefin Metathesis Catalysts., Chem. Rev., 2010, vol. 110 (3), pp. 1746-1787.
Phatake, R.S. et al., Tuning Thermal Properties of Cross-Linked DCPD Polymers by Functionalization, Initiator Type and Curing Methods, Polym Chem, 2020, vol. 11 (10), pp. 1742-1751.
More, C.V. et al., Polymeric Composite Materials for Radiation Shield: A Review, Springer International Publishing, 2021, vol. 19, pp. 2057-2090.
Jaworek, A., Micro- and Nanoparticle Production by Electrospraying, Powder Technology, 2007, vol. 176 (1), pp. 18-35.
Lyapkov, A.A. et al., Kinetics of Dicyclopentadiene Polymerization in the Presence of the Second Generation Hoveyda-Grubbs Catalyst with N-Chelating Ligand, Polymer Science—Series C, 2019, vol. 61 (1), pp. 41-48.
Kim, P. et al., Liquid-Infused Nanostructured Surfaces with Extreme Anti-Ice and Anti-Frost Performance, ACS Nano, 2012, vol. 6 (8), pp. 6569-6577.
Cho, S.J. et al., Replicable Multilayered Nanofibrous Patterns on a Flexible Film, Langmuir, 2010, vol. 26 (18), pp. 14395-14399.
Li, Y. et al., A Review of Electrospun Nanofiber-Based Separators for Rechargeable Lithium-Ion Batteries, J. Power Sources, 2019, vol. 443, Dec. 15, 2019, 71 pages.
Deng, X. et al., PH-Responsive Copoloymer Films Prepared by Surface-Initiated Polymerization and Simple Modification, Langmuir, 2020, vol. 36 (3), pp. 715-722.
Chen, Y. et al., An Omniphobic Slippery Membrane with Simultaneous Anti-Wetting and Anti-Scaling Properties for Robust Membrane Distillation, Journal of Membrane Science, 2020, vol. 595, 10 pages.
Commarieu, B. et al., Ultra-High Tg Thermoset Fibers Obtained by Electrospinning of Functional Polynorbornenes, Nanomaterials, 2022, vol. 12 (6), 9 pages.
Cai, G. et al., A Review on Micromixers, Micromachines (Basel, 2017, vol. 8 (9), 27 pages.
Han, D. et al., Coaxial Electrospinning Formation of Complex Polymer Fibers and Their Applications, Chempluschem, 2019, vol. 84 (10< pp. 1453-1497.
Kalla, S. et al., Anti-Fouling and Anti-Wetting Membranes for Membrane Distillation, Journal of Water Process Engineering, 2022, vol. 46, 24 pages.
Makovetskii, Catalytic Addition Polymerization of Norbornene and its Derivatives and Copolymerization of Norbornene with Olefins, Polymer Science, Ser. C., 2008, vol. 50, No. 1, pp. 22-38.

* cited by examiner

POLYMER FIBERS AND PARTICLES PRODUCED BY ELECTROSPINNING OR ELECTROSPRAYING

CROSS-REFERENCE TO RELATED APPLICATIONS/INCORPORATION BY REFERENCE

N/A

FIELD

Aspects of the present disclosure relate to polymer fiber mats and 3D fiber structures, and particles. More specifically, certain embodiments of the disclosure relate to structures produced by electrospinning (or electrospraying) and polymerization of monomers, such as in-situ ring-opening metathesis polymerization (ROMP) of cycloolefin monomers.

BACKGROUND

Conventional approaches for polymer fiber production may require dissolving the polymer in a relatively large amount (e.g., 80 wt. % or more) of organic solvent and/or use of high energy sources (such as heat or UV) and may limit the use of certain polymers.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

A system and/or method for using in-situ polymerization (such as ring-opening metathesis polymerization (ROMP) and/or vinyl addition polymerization) of cycloolefin monomers to fabricate polymer fibers, fiber mats, 3D polymer fiber structures, and polymer nano- and microparticles substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

BRIEF DESCRIPTION OF SEVERAL VIEWS OF THE DRAWINGS

The accompanying drawings referred to herein are not necessarily drawn to scale, but may be exaggerated to illustrate various aspects of the present disclosure.

DETAILED DESCRIPTION

Figure 1:
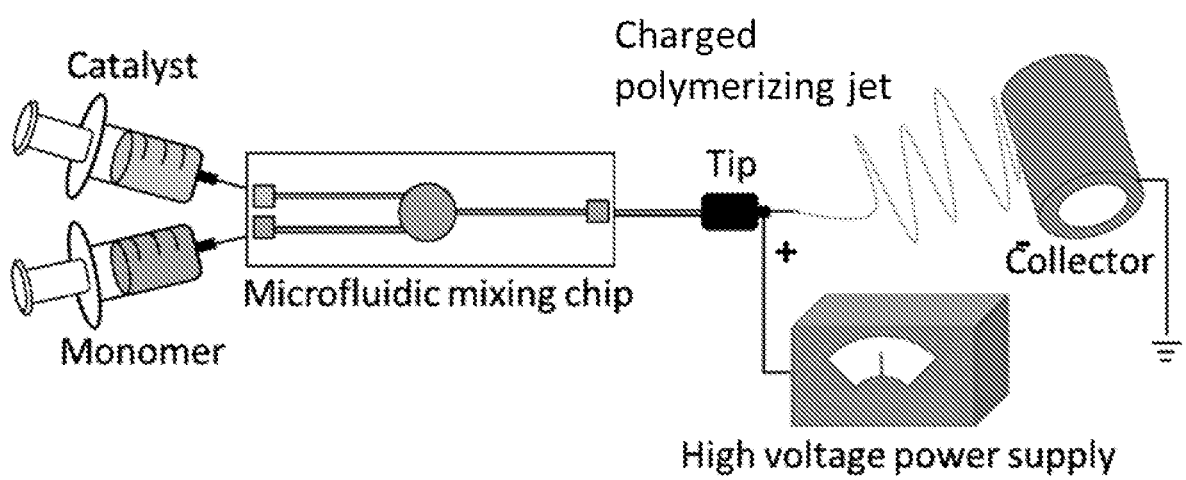
FIG. 1 is a schematic of an electrospinning/electrospraying setup suitable for fabrication of polymer fibers/particles using a microfluidic mixer, in accordance with an example embodiment of the disclosure.

Electrospinning and electrospraying are established techniques for production of nano- and microfibers and particles from a variety of polymer solutions or melts. The disadvantages of traditional electrospinning/electrospraying methods include, but are not limited to 1) high consumption of volatile organic solvents (usually wt. % of polymer is <20% in the electrospinning feed solution); 2) requirement of high heat application, limited variety and thermal stability of the resulting polymer fibers (when manufactured from melts); 3) need to synthesize and purify the polymers prior to their processing into the fiber/particle form.

This disclosure presents a method of polymer fiber/particle production by direct polymerization of monomers without use of any external high energy sources (such as heat or UV). This enables manufacturing of fibers/particles from high-performance polymers previously unattainable using conventional processing techniques (for example, nanofibers from thermoset polymers insoluble in organic solvents).

Polymerization of cycloolefin monomers (e.g., bicycle-[2.2.1]hept-2-ene, commonly known as norbornene) to prepare specialty polymers can be achieved via three methods (which produce sharply different polymer structures): ring-opening metathesis polymerization (ROMP), vinyl addition polymerization, and cationic (or radical) polymerization. Polymers derived from the radical polymerization have low molecular weights and irregular polymer structure, which limits the use of these polymers. Polymers produced via ROMP and vinyl addition polymerization exhibit superior properties, such as good mechanical strength, high chemical resistance, optical transparency, low dielectric constant, and high glass transition temperatures, which are desirable for a number of high-performance applications.

Ring-opening metathesis polymerization (ROMP) is a chain-growth polymerization method using olefins to produce monodisperse stereoregular polymers featuring double C—C bonds in the synthesized polymer backbone, which can be utilized for further polymer modification and functionalization. The mechanism of the ROMP reaction utilizes an alkylidene catalyst. Modern metathesis catalysts can polymerize a wide range of monomers in ambient conditions, including norbornenes, cyclooctenes, cyclobutadienes, etc. These monomers can be substituted with a variety of functional groups to obtain highly functional polymers with otherwise inaccessible structures and properties.

Vinyl addition polymerization proceeds by opening the C=C bond of cycloolefin monomers, resulting in polymers with fully saturated backbone containing bicyclic units. Complexes of iron, cobalt, nickel, titanium, zirconium, chromium, and palladium have been used as catalysts for vinyl addition polymerization of norbornene and cyclic olefins in general. Most metal complexes are inactive as such and need to be activated by a co-catalyst, such as methylalumoxane (MAO), perfluorinated boranes (e.g., tris (pentafluorophenyl)borane and trityltetrakis(pentafluorophenyl)borate).

Polymers prepared by ROMP and vinyl addition polymerization have demonstrated superior performance and durability as, for example, sorbents, dielectric layers, anion exchange membranes, membranes in pervaporation of water/alcohol mixtures and gas mixture separations, etc. However, the manufacturing processes for these polymer products are based on solution casting, which present challenges for commercialization due to limited scalability and exceedingly long processing times to obtain a finished product.

The methods described herein present facile routes for production of a wide range of ROMP-type and vinyl addition-type polymer fibers, mats, and 3D structures, as well as polymer nano-/microparticles through electrospinning/electrospraying and direct polymerization of functional monomers and/or polymerization with subsequent modification. The polymer products disclosed herein may be applied as specialty coatings and linings, separation membranes, membranes for energy devices, sorption/chromatographic media, etc. In some embodiments, the polymer fibers or particles may be poly(dicyclopentadiene), poly(norbornene), or derivatives or co-polymers thereof.

FIG. 1 is a diagram of an electrospinning/electrospraying system using a microfluidic mixer (micromixer), in accordance with an example embodiment of the disclosure. Referring to FIG. 1, there is shown a high voltage power supply, an electrically grounded collector, tip (which acts as the positive electrode), syringe pumps containing separate monomer and catalyst solutions, and a microfluidic mixing chamber (mixing chip), where the monomer and catalyst (and co-catalyst if needed) are mixed to create one combined solution. After mixing, the combined solution may be sent into the electrospinning tip.

Upon application of voltage to the tip (typically 5-30 kV DC or AC) the mixture of the monomer and catalyst solutions (combined solution) becomes electrically charged, and subsequently may be ejected from the tip toward the collector as a charged jet (charged polymerizing jet). The ejection happens when electrostatic repulsion overcomes the surface tension of the liquid leading to the eruption of the liquid stream (the point of eruption is known as the Taylor cone). If the molecular cohesion of the feed solution is sufficiently high, the charged liquid jet from Taylor cone is stabilized and elongated. Polymerization process may begin as soon as the monomer and catalyst are mixed and proceeds en route to the collector. The process results in polymer fibers deposited onto the collector. If the liquid stream breaks up upon ejection from the tip, droplets are electrosprayed resulting in deposition of polymer particles rather than fibers onto the collector.

In some embodiments, the collector may be a solid collector (e.g., a drum, disc, drum conveyor, plate or any other shape) or a liquid bath. A solid collector may be patterned or composite (comprised of materials with differing conductivity) to provide nanofiber structures with controlled morphology (e.g., woven, aligned fibers, etc.). The collector may be static, rotating or moving laterally, etc.

In some embodiments, the fibers/particles may be deposited directly onto a metal surface which comprises a finished part (e.g., a panel of automobile, aircraft or ship, an inner surface of a shipping/storage container, etc.) and acts as a collector.

The micromixer is preferably made from solvent resistant organic materials (e.g., polytetrafluoroethylene (PTFE), etc.) or inorganic materials (e.g., glass, silicon, etc.). The micromixer may be fabricated by laminating, polymer molding, 3D printing, or nanofabrication (e.g., electron beam lithography). The micromixer may consist of two or more inlets, at least one outlet, and at least one mixing channel. Solution containing ROMP (or vinyl addition polymerization) catalyst is supplied through at least one of the inlets, and at least one solution supplied through the other inlets contains olefin monomers polymerizable by ROMP (or vinyl addition polymerization). The micromixer may mix the feed solutions with efficiency of greater or equal to 70%. Mixing may be performed actively (i.e., an external energy is applied to disturb the fluids; the types of external energy may be pressure, temperature, acoustic vibration, electrical field, magnetic field, etc.) or passively (i.e., without any external force applied, where the structure of the microchannels enhances molecular diffusion and chaotic advection to ensure efficient mixing). The mixing channel configuration may be two- or three-dimensional (2D or 3D). Examples of suitable mixing channel geometry include serpentine (2D or 3D), split-and-recombination (SAR) (2D or 3D), spiral (2D and 3D), etc. The mixing channels may vary in dimensions. The mixing channel length may be between about 0.2 to about 120 mm, for instance: between 0.2 mm and 5.5 mm, or between 5 mm and 11 mm, or from about 7.5 m to about 30 mm, or from about 25 mm to about 100 mm, or any value less than 120 mm. The mixing channel width may be between about 10 μm to about 2 mm, for instance between about 10 μm and 30 μm, or more than 50 μm, or between about 200 and 650 μm or more than about 100 μm, or any value of less than about 2 mm.

Figure 3:
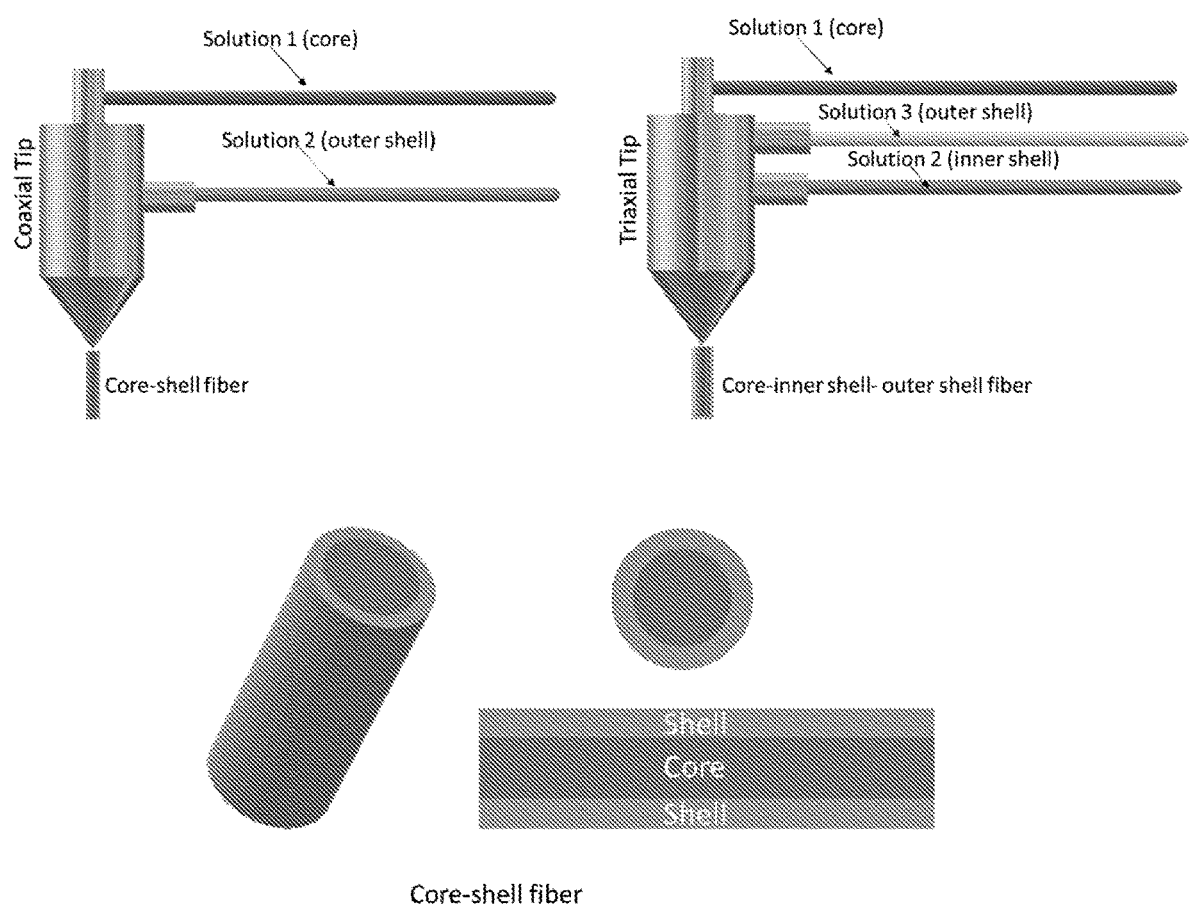
FIG. 3 illustrates a tip having a coaxial or triaxial configuration and also illustrates core-shell (core-sheath) nanofibers made by a coaxial tip, in accordance with an example embodiment of the disclosure.

The tip (a.k.a., nozzle, spinneret, emitter) may be of any shape and configuration as long as it is able to deliver the solution at a controlled rate through its openings (slots, needle, bevels, etc.). The tip is preferably made of electrically conducting and chemically resistant materials. The tip may have a single phase (e.g. FIG. 1), coaxial or triaxial configuration (e.g. FIG. 3). The configuration of the microfluidic mixer is in accordance with the configuration of the tip. For a single-phase tip, a micromixer with a single outlet may be used. For a coaxial (triaxial) tip, i) two (three) separate micromixers may be used to mix the feed solutions for each of the axes, ii) one (two) of the axes may not be equipped with a micromixer, and have a direct solvent or gas feed; iii) a single micromixer with multiple inlets, two (three) mixing channels, and two (three) outlets (each outlet feeding a distinct axis) may be used.

Travel of the feed solution through the tip may occur at constant speed (may be between 0.02 to 0.5 mL/min, or between 0.1 and 2 mL/min, or between 1 and 10 mL/min or less than or equal to 50 mL/min) to achieve consistent fiber deposition. To achieve uniform deposition, the extent of polymerization reaction at the tip may be kept constant (so that the viscosity of the given feed solution at the emitter (tip)_remains constant throughout the electrospinning process). After monomer and catalyst solutions come into contact, due to onset of polymerization, the viscosity of the mixed solution increases as a function of time; however, the optimal viscosity at the emitter is specific for a given solution and depends on the concentration of the components, type of solvents, presence of additives, etc. The kinetics of polymerization primarily depend on the types of monomers and catalyst and their respective concentrations. The extent of polymerization in a given feed solution may be controlled in part by the duration of mixing within the microfluidic mixer. In some embodiments, the extent of polymerization is determined by the time of mixing in the microfluidic mixing chamber; the duration of mixing may be <60 sec; in further embodiments the duration of mixing may be between 1 sec and 60 sec. The viscosity of the mixed solution should be within an appropriate range for electrospinning: a too low viscosity may result in electrospraying (producing droplets yielding polymer particles instead of fibers), while a too high viscosity may result in blockage of the emitter and prevent extrusion of the fiber. Solution viscosities of <10 Pa·s may result in "bead on string" fiber morphology rather than cylindrical fibers. In some embodiments, particles are the desired outcome and thus conditions are maximized to produce electrospraying.

In the present disclosure, to obtain polymer fibers the feed solutions and the mixing duration are designed such that the solution viscosity at the emitter is within the range of 8 to 15 Pa·s if thinner (i.e., <2 μm-thick) fibers are desired and up to 60 Pa·s to obtain thicker fibers. In some embodiments, thicker fibers may be obtained with a solution viscosity at the emitter is within the range of 15 to 60 Pa·s. For example, the solution viscosity reached 12 Pa·s after 30 s of mixing for a solution of dicyclopentadiene monomer (DCPD) and Grubbs' $2^{nd}$ generation (G2) catalyst in dichloromethane (DCM) with the monomer to catalyst molar ratio of 15,000:1 and the monomer to solvent volume ratio of 5:1, yielding fibers with diameters of 650±100 nm after electrospinning (applied voltage of 10 kV, 5 cm distance to the collector, room temperature (25° C.), relative humidity (RH) of 50%).

Polymer fibers with diameter from about 50 nm to about 120 nm, from about 100 nm to about 500 nm, from about 350 to about 1000 nm, from about 0.8 μm to about 5 μm, from about 4 μm to about 20 μm, from about 50 μm to 250 μm, from about 200 μm to about 500 μm can be produced depending on the chosen process parameters, such as applied voltage, monomer/catalyst ratio, solvent choice, mixing duration, speed of feeding the solution into the tip (flow rate), distance to the collector, etc. Other ranges are also possible. For sorption, chromatography, sensing etc., where high surface area for element and analyte binding is beneficial, fibers with diameters less than or equal to 1 μm are preferable. For certain membrane applications, fibers with diameter of >1 μm are preferable to ensure stability for long-term performance in harsh operating conditions.

In the present disclosure, to obtain polymer particles rather than fibers, the properties of the feed solution and process parameters are adjusted to create the conditions for electrospraying. For example, electrospraying occurs when the feed solution viscosity is sufficiently low (e.g., less than or equal to 8 Pa·s), the surface tension of the solution at 20° C. is below 50 mN/m, and the conductivity of the solution falls within the range from about $10^{-1}$ to about $10^{-9}$ S/m. Several parameters may be varied to modulate the size and morphology of the particles, such as the type and concentration of solvent, monomer, additives, and catalyst, the applied voltage, the flow rate, and the distance between the tip and collector. Polymer particles with the diameter of about 10 nm to about 80 μm (any value within this range) may be produced, and preferably of the diameter of equal or below 1 μm (this size is difficult to achieve by conventional mechanical spraying methods). The particles described in this disclosure may be used as specialty coatings (e.g., for solid lubrication, antifouling), sorbents/scavengers/chromatographic media in industrial processes, solid supports for catalysts, etc.

Fiber/particle diameter may be determined by taking at least a hundred measurements of the diameters of different fibers/particles from a set of SEM micrographs using an image processing software (e.g., ImageJ) and calculating the mean value and standard deviation of the mean.

The catalyst (a.k.a., initiating moiety) used may be any catalyst suitable to initiate a ring-opening metathesis or vinyl addition polymerization. These catalysts may include a metal.

In some embodiments, for vinyl addition polymerization, the catalysts may be chosen from three groups (by their metal composition): 1) early transition metal catalysts, such as metallocene catalysts of zirconium; 2) complexes of chromium, iron, cobalt, and copper; 3) late transition metal nickel (II) and palladium (II) catalysts. Cationic palladium complexes of the general formula $[Pd(NCR)_4]^{2+}2X^-$ are active without a co-catalyst. For the present disclosure, the catalysts tolerant for ambient moisture and air are of primary importance, for example Pd(0)- and Pd(2+)-complexes (such as tris(dibenzylideneacetone)dipalladium(0)) with aryl iodides and aryl diazonium salts as co-catalysts.

In some embodiments, for ROMP, an initiating moiety may include a metal selected from the group consisting of ruthenium, molybdenum, titanium, tungsten, osmium and iron. In some embodiments, the metal is a late transition metal. In some embodiments, the initiating moiety may be formed from an initiating compound selected from a Grubbs' catalyst (ruthenium(II)-based complexes that may contain, for example, bis-phosphane and/or N-heterocyclic carbene ligands), Hoveyda-Grubbs' catalyst (ruthenium(II) carbene complexes containing an ortho-isopropoxybenzylidene moiety), or Schrock catalyst (featuring molybdenum(VI)- or tungsten(VI)-based centers supported by alkoxide and imido ligands). A Grubbs' catalyst may include an acid-activated catalyst system, where its metathesis activity is activated by UV or by electromagnetic waves (including but not limited to 300-420 nm light).

General structures of some catalysts suitable for ROMP are presented below as Formulas (I), (II) or (III):

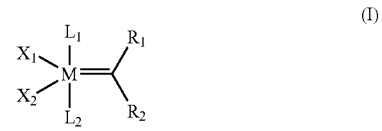
(I)

where: i) M is a metal, preferably selected from Ru, Mo, Ti, W, Os and Fe; ii) $R_1$ and $R_2$ are each independently selected from the group consisting of H, $C_{2-20}$ alkenyl, $C_{2-20}$ alkynyl, $C_{1-20}$ alkyl, aryl, $C_{1-20}$ carboxylate, $C_{1-20}$ alkoxy, $C_{2-20}$ alkenyloxy, $C_{2-20}$ alkynyloxy, aryloxy, $C_{2-20}$ alkoxycarbonyl, $C_{1-20}$ alkylthio, $C_{1-20}$ alkylsulfonyl and $C_{1-20}$ alkylsulfinyl; iii) $X_1$ and $X_2$ each represent an anionic ligand (e.g., halogen (e.g., Cl), SH, COOH, OH, CN, $OCH_3$, $CF_3$); and iv) $L_1$ and $L_2$ each represent a neutral electron donor (e.g., tricyclohexylphosphine ($PCy_3$), 1,3-bis(2,4,6-trimethylphenyl)-1,3-dihydro-2H-imidazol-2-ylidene (IMes) or 1,3-bis(2,4,6-trimethylphenyl)-4,5-dihydroimidazol-2-ylidene (SIMes)).

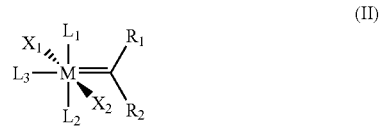
(II)

where: i) M is a metal, such as ruthenium or osmium; ii) $X_1$ and $X_2$ may be the same or different and are each independently an anionic ligand (e.g., halogen (e.g., Cl), SH, COOH, OH, CN, $OCH_3$, $CF_3$); iii) $L_1$, $L_2$ and $L_3$ may be the same or different and are each independently a neutral electron donor ligand (e.g., tricyclohexylphosphine ($PCy_3$), 1,3-bis(2,4,6-trimethylphenyl)-1,3-dihydro-2H-imidazol-2-ylidene (IMes) or 1,3-bis(2,4,6-trimethylphenyl)-4,5-dihydroimidazol-2-ylidene (SIMes)), optionally further including one or more functional groups such as hydroxyl, thiol, thioether, ketone, aldehyde, ester, ether, amine, imine, amide, nitro, carboxylic acid, disulfide, carbonate, isocyanate, carbodiimide, carboalkoxy, carbamate, halogen, alcohol, sulfonic acid, phosphine, imide, acetal, ketal, boronate, cyano, cyanohydrin, hydrazine, enamine, sulfone, sulfide, and sulfenyl; iv) in some embodiments, at least one of $L_1$, $L_2$ or $L_3$ may be a heterocyclic carbene ligand; and v) $R_1$ and $R_2$ are each independently hydrogen or a substituent selected from the group consisting of $C_{1-20}$ alkyl, $C_{2-20}$ alkenyl, $C_{2-20}$ alkynyl, aryl, $C_{1-20}$ carboxylate, $C_{1-20}$ alkoxy, $C_{2-20}$ alkenyloxy, $C_{2-20}$ alkynyloxy, aryloxy, $C_{2-20}$ alkoxycarbonyl, $C_{1-20}$ alkylthio, $C_{1-20}$ alkylsulfonyl and $C_{1-20}$ alkylsulfinyl and silyl. Optionally, each of the $R_1$ and $R_2$ substituent group may be substituted with one or more moieties selected from the group consisting of $C_{1-10}$ alkyl, $C_{1-10}$ alkoxy, and aryl which in turn may each be further substituted with one or more groups selected from a halogen, a $C_{1-5}$ alkyl, $C_{1-5}$ alkoxy, and phenyl.

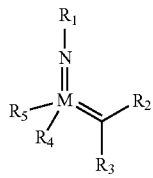

(III)

where: i) M is a metal, preferably selected from Ru, Mo, Ti, W, Os and Fe; ii) $R_1$ is selected from the group consisting of unsubstituted or substituted aryl, unsubstituted or substituted heteroaryl, unsubstituted or substituted alkyl, and unsubstituted or substituted heteroalkyl; iii) $R_2$ and $R_3$ are each independently selected from the group consisting of H, unsubstituted or substituted alkyl, unsubstituted or substituted heteroalkyl, unsubstituted or substituted aryl and unsubstituted or substituted heteroaryl; iv) $R_4$ and $R_5$ may be the same or different and are each independently selected from the group consisting of unsubstituted or substituted alkyl, unsubstituted or substituted heteroalkyl, unsubstituted or substituted aryl and unsubstituted or substituted heteroaryl.

Specific examples of Ru catalysts include the following:

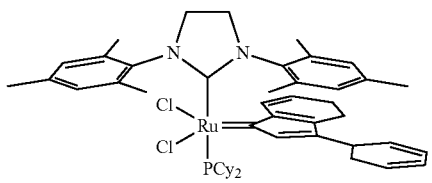

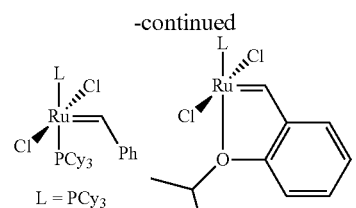

-continued

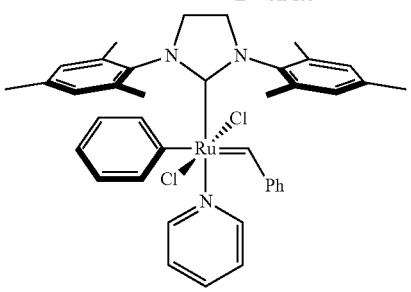

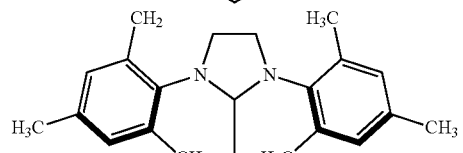

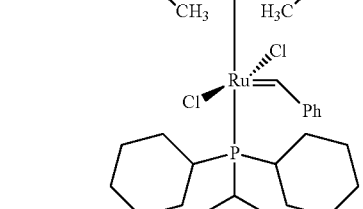

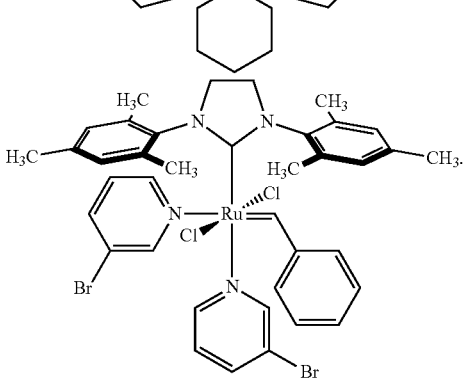

The catalyst is dissolved in an appropriate organic solvent such as toluene, DCM, tetrahydrofuran (THF), etc. Mixtures of solvents may be used. The catalyst to monomer molar ratio in the electrospinning/electrospraying feed solution (combined solution) may be 50,000:1, 15,000:1, 12,000:1, 10,000:1, 5,000:1 or lower, including any ratios of less than or equal to about 100,000:1. In some embodiments, the catalyst to monomer molar ratio in the combined solution is between 50,000:1 and 5,000:1; in other embodiments, the catalyst to monomer molar ratio in the combined solution is between 15,000:1 and 10,000:1.

Monomers may be chosen from olefin or cyclic olefin compounds including but not limited to norbornene, dicyclopentadiene, cyclobutene, cyclooctene, cyclooctadiene, polycyclic dienes, trienes, etc. and any derivatives thereof and their mixtures. The monomer solution contains either neat liquid monomer or monomer dissolved in an appropriate organic solvent or a mixture of solvents (such as toluene, dichloromethane (DCM), tetrahydrofuran (THF), etc.).

In some embodiments, the monomer concentration in the solution may be from about 0.01 M to 0.1 M or from 0.1 M to 0.5 M or from 0.5 M to 1 M or from 1 M to 3 M or less than or equal to 10 M or any value between 0.01 M and 10 M. In certain embodiments, the monomer concentration may be from about 0.1 M to 5 M; in other embodiments, the monomer concentration may be from about 1 M to 5 M.

In some embodiments, monomer may be mixed with solvent to from a suspension with any appropriate volume (or mass) ratio of the monomer to the solvent, for example 4:1, 3:2, 6:1, 1:1, 1:2, etc.

In some embodiments, the polymerizable cyclic olefin monomer may be a norbornene-based compound, the ROMP of which results in a polymer described by the formula below:

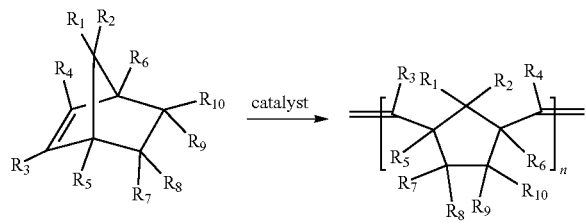

where $R_1$, $R_2$, $R_3$, $R_4$, $R_5$, $R_6$, $R_7$, $R_8$, $R_9$, and $R_{10}$ are each independently a hydrogen atom, a halogen atom, a hydroxyl group, a carboxyl group, an amino group, a cyano group, a substituted or unsubstituted $C_{1-20}$ alkyl group, a substituted or unsubstituted $_{C1-20}$ alkoxy group, a substituted or unsubstituted $C_{2-20}$ alkenyl group, a substituted or unsubstituted $C_{2-20}$ alkynyl group, a substituted or unsubstituted $C_{6-30}$ aryl group, a substituted or unsubstituted $C_{7-30}$ arylalkyl group, a substituted or unsubstituted $C_{7-30}$ alkylaryl group, a substituted or unsubstituted $C_{1-20}$ heteroalkyl group, a substituted or unsubstituted $C_{4-30}$ heteroaryl group, a $C_{7-30}$ arylcarbonyl group, a $C_{2-20}$ alkyloxycarbonyl group, a $C_{2-20}$ alkylcarbonyl group, or a $C_{2-20}$ alkylcarbonyloxy group.

$R_1$ and $R_2$ together may represent =O, i.e., instead of $R_1$ and $R_2$ representing two different substituents bound to a carbon of the norbornene-based compound, $R_1$ and $R_2$ together may represent an oxygen atom that is doubly bonded to the carbon. $R_7$ and $R_9$ may be bound to each other to form, together with the carbon atoms to which $R_7$ and $R_9$ are bound, a five-membered ring or six-membered ring structure, or a hetero cyclic structure. $R_8$ and $R_{10}$ together may represent a single bond, i.e., $R_8$ and $R_{10}$ together may represent an additional bond between the carbons to which $R_9$ and $R_7$ are attached in addition to the bond already shown in the formula above, thereby providing a double bond between these carbons.

In some embodiments, the polymerizable cyclic olefin monomer may be a dicyclopentadiene-based compound, the ROMP of which results in a polymer described by the formula below:

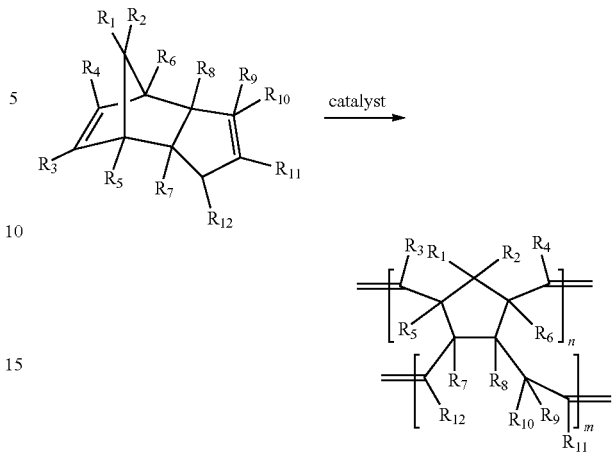

where $R_1$, $R_2$, $R_3$, $R_4$, $R_5$, $R_6$, $R_7$, $R_8$, $R_9$, $R_{10}$ $R_{11}$, and $R_{12}$ are each independently a hydrogen atom, a halogen atom, a hydroxyl group, a carboxyl group, an amino group, a cyano group, a substituted or unsubstituted $C_{1-20}$ alkyl group, a substituted or unsubstituted $C_{1-20}$ alkoxy group, a substituted or unsubstituted $C_{2-20}$ alkenyl group, a substituted or unsubstituted $C_{2-20}$ alkynyl group, a substituted or unsubstituted $C_{6-30}$ aryl group, a substituted or unsubstituted $C_{7-30}$ arylalkyl group, a substituted or unsubstituted $C_{7-30}$ alkylaryl group, a substituted or unsubstituted $C_{1-20}$ heteroalkyl group, or a substituted or unsubstituted $C_{4-30}$ heteroaryl group.

$R_1$ and $R_2$ together may represent =O, and $R_9$ and $R_{10}$ together may represent =O.

In certain embodiments, monomers are chosen from fluorinated monomers polymerizable by ROMP or vinyl addition polymerization, including but not limited to fluorinated norbornene derivatives.

Polymer fibers made using fluorinated monomers may have applications in: 1) solvent resistant, robust membranes for industrial separations in harsh environments; 2) sorbents for organics; 3) membranes, separators for energy devices (batteries, fuel cells, etc.); 4) additives (from 0.1 to 99% by weight) to composite materials (as chopped fibers, 3D structure or mats) prepared by injection molding, molding under pressure, lamination, etc.; 5) super-omniphobic nanofiber matts (applied as coatings or linings); 6) specialty coatings.

Polymer particles made using fluorinated monomers may have applications in: 1) additives (from 0.1 to 99% by weight) to composite materials; 2) specialty coatings for surfaces or membranes; 3) sorbents, etc.

Fluorinated norbornene derivatives may be obtained through a Diels-Alder reaction of cyclopentadiene (or [2.4] hepta-4,6-diene) with fluorinated olefins. Monomers include but are not limited to the following:

Mono- and disubstituted bicyclo [2.2.1] hept-2-enes

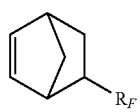

$R_F$ = $C_4F_9$, $C_6F_{13}$, $C_8F_{17}$, $C_{10}F_{21}$

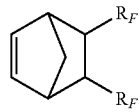

$R_F$ = $C_4F_9$, $C_6F_{13}$, $C_8F_{17}$

-continued
Bicyclo- monomers, etc.

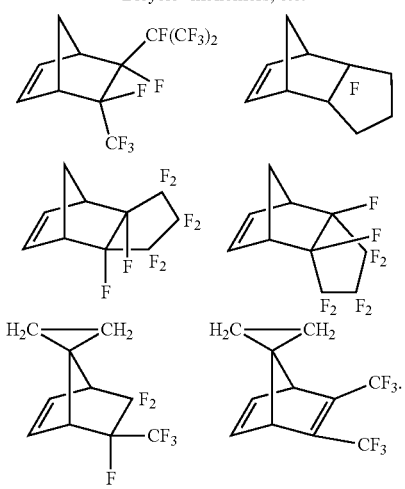

For example, the chemical structure of polymer fibers/particles resulting from the disclosed process using the monomers described above may be as follows:

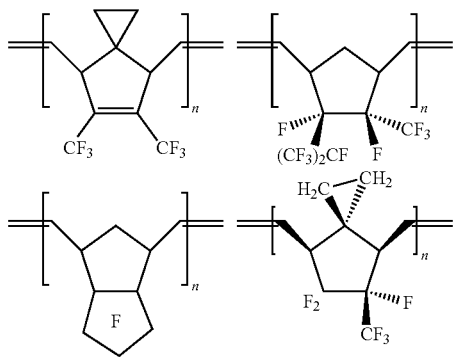

etc.

For example, electrospraying using 3 M solution of 5-(perfluorohexyl)norbornene monomer in DCM with the second generation Grubs' catalyst (monomer to catalyst molar ratio of 20,000:1, mixed for 30 s), 15 kV applied voltage, 15 cm distance to the collector may yield particles with mean diameter of about 170±90 nm.

Another example, electrospinning using neat 5-(perfluorohexyl)norbornene monomer mixed with DCM (volume ratio of 4:1) with the second generation Grubs' catalyst (monomer to catalyst molar ratio of 12,000:1, mixed for 30 s), 10 kV applied voltage, 5 cm distance to the collector may yield fibers with mean diameter of about 450±140 nm.

The fluorinated polymer fibers disclosed have desirable properties for a variety of applications. For example, the polymer fibers/particles are optically transparent. The refractive index n at 25° C. of these polynorbornene derivatives varies from 1.35 to 1.41 (an increase in the amount of fluorine leads to a decrease in the refractive index).

Polymer fibers/particles with high content of fluorine are insoluble in most organic solvents (with the exception of fluorinated solvents, such as hexafluorobenzene). Polymer fibers/particles are considered insoluble herein if their mass loss is less than 5% of their initial mass after having been stored in solvent for an extended period of time, e.g. more than 24 hours.

Fibers/particles from the following polymer are soluble in THF and acetone. Glass transition temperature (Tg) of this polymer is 193° C.

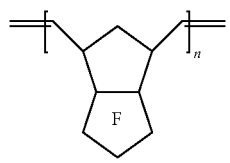

Fibers/particles from fluorinated norbornene derivatives have good oxidative stability, resistance to acids and basis, and good thermal stability (decomposition temperature, i.e., 5% weight loss determined by thermogravimetric analysis (TGA), is >350° C. for all polymer formulations and high glass transition temperature, Tg is >100° C. for all polymer formulations).

All the fluorinated fibers/particles are omniphobic, as evidenced from contact angle measurements: an in-air sessile advancing contact angle for water >110° and for hexadecane >60° (both increase with the increasing content of fluorine).

All the described fluorinated fibers/particles have dielectric permittivity lower than 3.0 (measured from −100° C. to +100° C. in the range of frequency from $1\times10^{-2}$ Hz to 1 MHz) with no significant change with increasing temperature.

Fibers made from functionalized norbornene derivatives, some examples of which are presented below, may have application in: 1) media for affinity separations (metal ions, specific organic molecules, biomolecules); 2) immobilized reagent cartridges for in-line diversification or purification (i.e., scavengers) for application in combinatorial chemistry, facilitated synthetic protocols, multi-well plates; 3) sensing layers; 4) solid supports for catalysts; 5) proton and ion-exchange membranes; and other uses.

In certain embodiments, polymer fibers/particles are made from a 5-norbornene-2-methanol monomer as follows:

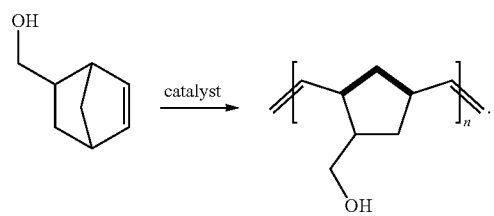

For example, electrospinning using a mixture of the 5-norbornene-2-methanol monomer and DCM (volume ratio 4:1) with second generation Grubbs' catalyst (monomer to catalyst molar ratio 12,000:1), may yield poly(5-norbornene-2-methanol) fibers with mean diameter of 320±60 nm when the following operating parameters are utilized: 10 kV applied voltage, 5 cm distance to the collector, 50% RH, mixing duration of 30 s, feed solution flow rate of 5 mL/min.

Products made of poly(5-norbornene-2-methanol) (pNBOH) may be stable for storage in air for at least 6 months. The hydroxyl groups of the polymer may be modified via multiple post-polymerization modification reactions to a variety of functional groups, including but not limited to: nucleophilic substitution of the hydroxyl group (e.g., via a reaction with thionyl chloride at room temperature); electrophilic substitution at oxygen, e.g., to from esters via a reaction with electrophilic derivatives of carboxylic and sulfonic acids.

In certain embodiments, fibers/particles are made from a trans-3,6-endomethylene-1,2,3,6-tetrahydrophthaloyl chloride (alternative names: trans-5-norbornene-2,3-dicarbonyl chloride, trans-5-norbornene-2,3-dicacyl chloride) monomer (NBDAC) as follows:

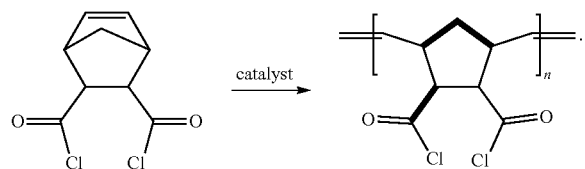

For example, electrospinning using a mixture of the trans-5-norbornene-2,3-dicarbonyl chloride monomer and DCM (volume ratio 4:1) with second generation Grubbs' catalyst (monomer to catalyst molar ratio 6,000:1), may yield poly(trans-5-norbornene-2,3-dicarbonyl chloride) fibers with mean diameter of 1000±250 nm when the following operating parameters are utilized: 5 kV applied voltage, 5 cm distance to the collector, at room temperature (25° C.) and 50% RH, mixing duration of 30 s, feed solution flow rate of 2 ml/min.

The poly(trans-5-norbornene-2,3-dicarbonyl chloride) fibers may be stable for at least a week if stored in inert atmosphere. Otherwise, the polymer may be immediately modified by simply dipping the fibers in a reaction solution and rinsing to remove byproducts.

In certain embodiments fibers from random copolymers may be made from a feed solution containing two of more types of olefin monomers. Any combination of molar ratios of the monomers in the solution may be utilized, for example each monomer can be present in equal molar ratios to another (1:1, 1:1:1, etc.), other examples include but are not limited to molar ratios of different monomers of 3:1, 5:1, 2:3, 1:4, 2:1:2, 6:1:3, 10:5:3:1, etc.

In one embodiment, fibers are made from a feed solution containing 3 M of trans-5-norbornene-2,3-dicarbonyl chloride (NBDAC) and 3 M of dicyclopentadiene (DCPD) in DCM mixed with the catalyst solution for 30 s (ratio of monomers to catalyst 23,000:1). fibers with mean diameter of 240±170 nm may be obtained using applied voltage of 10 kV, 5 cm distance to the collector, at room temperature (25° C.) and RH of 50%. Other combinations and types of monomers may be utilized to obtain copolymer fibers.

Copolymerization of NBDAC with DCPD enables adjusting of the content of modifiable acid chloride groups within the polymer and may result in improved thermal and mechanical properties of poly(dicyclopentadiene)-co-poly(trans-5-norbornene-2,3-dicarbonyl chloride) (pDCPD-co-pNBDAC) copolymer compared to pNBDAC homopolymer (Tg of pDCPD=158° C., the average Young's modulus of pDCPD nanofibers (based on 6 samples with the fiber diameters ranging from about 200 nm to about 900 nm)=15±5 GPa as measured by Atomic Force Microscopy (AFM)).

Figure 2:
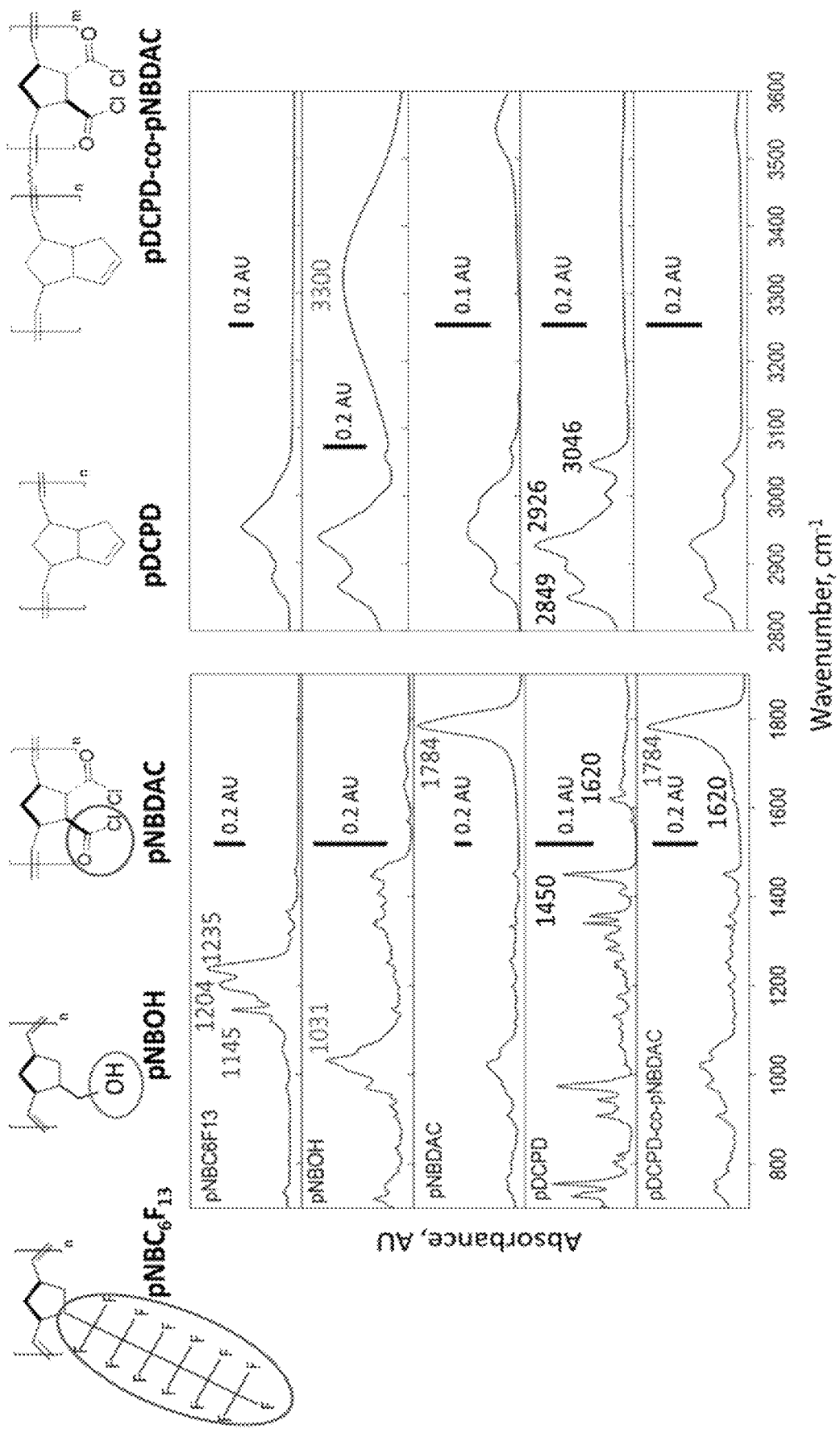
FIG. 2 shows a representation of chemical structure of polymer fibers and Attenuated Total Reflectance Fourier Transform Infrared (ATR-FTIR) spectra confirming the composition of the fibers, in accordance with an example embodiment of the disclosure.

The chemical composition of polymer fibers/particles may be confirmed by methods such as various types of spectroscopy. For example, Attenuated Total Reflectance Fourier Transform Infrared (ATR-FTIR) Spectroscopy may be utilized. FIG. 2 shows ATR-FTIR spectra for polymer fibers according with the examples presented in this disclosure, including poly(5-(perfluorohexyl)norbornene) pNBC$_6$F$_{13}$, poly(norbornene-2-methanol) (pNBOH), poly(trans-5-norbornene-2,3-dicarbonyl chloride) (pNBDAC), poly(dicyclopentadiene) (pDCPD), and poly(dyciclopentadiene)-co-poly(trans-5-norbornene-2,3-dicarbonyl chloride) (pDCPD-co-pNBDAC). The absorption peaks for characteristic functional groups in each polymer are highlighted in their respective spectra. The spectrum of pNBC$_6$F$_{13}$ demonstrates a series of absorbance peaks associated with the C$_6$F$_{13}$ pendant group: CF stretching and deformation of CF$_3$—CF$_2$— at 1367 cm$^{-1}$ and 734 cm$^{-1}$, respectively; CF$_2$— asymmetric stretching at 1235 and 1204 cm$^{-1}$; CF$_2$— asymmetric stretching at 1145 cm$^{-1}$; CF stretching of —CF$_3$ at 1168 and 1052 cm$^{-1}$. The spectrum of pNBOH shows a strong absorbance peak at 3000-3500 cm$^{-1}$ due to the hydroxyl group, peaks at 1010 and 1058 cm$^{-1}$ due to C—O stretching, 1031 cm$^{-1}$ due to C—C—O stretching of the pendant group. The spectrum of pNBDAC fibers shows a characteristic absorbance peak at 1784 cm$^{-1}$ due to C═O stretching of acid chloride, a peak due to Csp$_3$-H asymmetric stretching at 2872 cm$^{-1}$, Csp$_3$-H asymmetric stretching at 2949 and 2996 cm$^{-1}$, and the Csp$_2$-H stretching at 3070 cm$^{-1}$. The spectrum of pDCPD shows the characteristic peaks at 1620 cm$^{-1}$ due to C═C stretching, 1450 cm$^{-1}$ due to a Csp$_3$-H scissoring, 1409 cm$^{-1}$ due to a Csp$_2$-H scissoring; multiple wagging and twisting peaks in the region 1356-1150 cm$^{-1}$, multiple Csp$_2$-H out-of-plane bending vibration absorption bands between 1000-650 cm$^{-1}$ and a peak at 727 cm$^{-1}$ due to Csp$_3$-H rocking. The peaks in the hydrocarbon stretching region of the pDCPD spectrum correspond to the Csp$_2$-H stretching at 3046 and 3003 cm$^{-1}$, the Csp$_3$-H asymmetric stretching at 2894, 2849, and 2926 cm$^{-1}$. The spectrum of pDCPD-co-pNBDAC random copolymer fibers includes absorbance peaks characteristic for both pNBDAC and pDCPD.

In some embodiments, fibers/particles contain reactive chemical groups, which are converted to different chemical groups, cross-linked or otherwise modified via post-polymerization modification. This modification includes, but is not limited to, dipping the polymer fibers into corresponding reaction solutions or exposing the polymer to vapors of the reagents. In certain embodiments, post-polymerization modifications result in fluorinated polynorbornene derivatives; poly(5-norbornene-2-carboxylic acid), poly(5-norbornene-2-hydroxamic acid), or poly(5-norbornene-2-endo, 3-exo-disufonic acid).

In one embodiment, poly(trans-5-norbornene-2,3-dicarbonyl chloride) fibers may be further modified by reacting the acid chloride groups of the polymer with selected compounds (e.g., amines, alcohols, thiols, etc.) to endow the

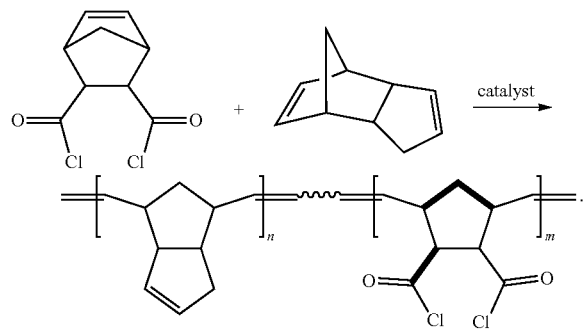

polymer with desired properties by addition of functional groups. Added properties include, but are not limited to one or more of metal chelation, temperature-responsivity, pH-responsivity, fluorescence, gas sorption, resistance to fouling, and/or bio-/organic molecule binding. The modification may be performed by dipping the polymer fibers into corresponding reaction solutions or exposing the polymer to vapors of the reagents.

Examples of fiber chemical compositions that may be obtained via post-polymerization modification of poly(trans-5-norbornene-2,3-dicarbonyl chloride) (pNBDAC) include but are not limited to the following:

i) Fibers with carboxylic acid functional groups:

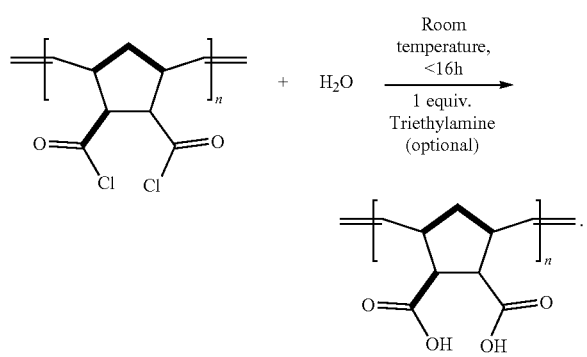

After electrospinning, pNBDAC and pNBDAC copolymer (e.g., pDCPD-co-pNBDAC) fibers may be immersed into water for the duration of 1 min to 30 minutes or preferably under 16 hours or up to 24 hours to modify the acid chloride groups within the polymer to carboxylic acid groups. A weak base, such as triethylamine (e.g., in the quantity of ~1 or 2 molar equivalents to the estimated molar amount of acid chloride groups within the polymer), may be added to the solution to scavenge the acid released by the reaction. The modification may be preferably conducted at room temperature or the solution may be heated up above the room temperature (e.g., between 35 and 70° C.) to increase the rate of reaction. After modification, the fibers are washed in di-ionized water and may be dried (e.g., by heating and/or under reduced pressure). Depending on the duration of reaction and other reaction conditions, 100% of the acid chloride groups may be modified to carboxylic acid (i.e. poly(trans-5-norbornene-2,3-diacyl chloride) is converted to poly(trans-5-norbornene-2,3-dicarboxilic acid)), or about from 10% to about 100% of the acid chloride groups may be modified to carboxylic acid, including between 10 and 40%, or about 50% or below 80% and all values up to about 100%. The remaining unreacted acid chloride groups may be subsequently modified via an alternative reaction (e.g., to esters by reaction with an alcohol, such as ethanol). The poly(trans-5-norbornene-2,3-dicarboxilic acid) fibers have characteristics of a hydrogel: water sorption by weight may be >400 times the weight of the polymer fibers.

ii) Fibers with hydroxamic acid functional groups:

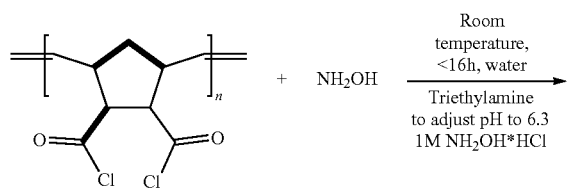

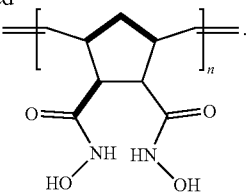

After electrospinning, pNBDAC and pNBDAC copolymer fibers may be immersed into an aqueous solution containing hydroxylamine hydrochloride in concentration from about 10 mM to about 8M, including all the values in this range, for example 0.1 M or 1 M. The duration of reaction may be between 1 min to 30 minutes or preferably under 16 hours or up to 24 hours to modify the acid chloride groups within the polymer to hydroxamic acid groups. The pH of the reaction solution may be adjusted to between pH=5 and pH=7, and preferably to pH=6.3 by addition of triethylamine, or reaction may be carried out in a buffer solution of the desired pH (e.g., in potassium phosphate buffer). The modification may be preferably conducted at room temperature or the solution may be heated up above the room temperature (e.g., between 35 and 70° C.) to increase the rate of reaction. After modification, the fibers are washed in di-ionized water and may be dried (e.g., by heating and/or under reduced pressure). Depending on the duration of reaction and other reaction conditions, 100% of the acid chloride groups may be modified to hydroxamic acid (i.e. poly(trans-5-norbornene-2,3-diacyl chloride) is converted to poly(trans-5-norbornene-2,3-hydroxamic acid)), or about from 10% to about 100% of the acid chloride groups may be modified to hydroxamic acid, including between 10 and 40%, or about 50% or below 80% and all values up to about 100%. The remaining unreacted acid chloride groups may be subsequently modified via an alternative reaction (e.g., to esters via reaction with an alcohol, such as ethanol, or to amides by reaction with an amine, such as isopropylamine, etc.).

Poly(trans-5-norbornene-2,3-hydroxamic acid) decomposes at 170° C. due to the degradation of the side groups (as determined by thermogravimetric analysis). The fibers may selectively chelate 3+ ions from a mixture with other types of ions (e.g., ions with oxidation numbers of 2+ and 1+). The fibers with may have a maximum sorption of metal ions of two ions per repeat unit of the polymer.

Fibers made of poly(trans-5-norbornene-2,3-dicarboxilic acid), poly(trans-5-norbornene-2,3-hydroxamic acid) and their copolymers with pDCPD are optically transparent. The fibers from these polymers and their copolymers may form complexes with metals and metalloids. With these fibers elements may be repeatedly sorbed from a solution and removed from the fibers by rinsing with (or an immersion into) an acid solution or a solution with a chelating agent (such as ethylenediaminetetraacetic acid (EDTA)). The fibers can be used for recovering elements such as metal ions or metalloids (e.g., including but not limited to rare earth elements, metal ions such as $Zn^{2+}$, $Cu^{2+}$, $Fe^{2+}$, $Fe^{3+}$, $Al^{3+}$, etc.) from an aqueous or organic solution by sorption. The fibers may change color upon chelation of metal ions (e.g., from clear to light brown upon chelation of $Fe^{3+}$). The fibers may also be used as active layers for analyte binding for sensing of metal ions, for example, as a part of optical, piezoelectric, or electrical sensor applied for infrastructure health (e.g., corrosion detection) or chemical/biological/extraction process monitoring.

In certain embodiments, fibers/particles containing acid chloride functional groups may be modified in analogous manner to install alternative element-binding groups within the polymer, by a reaction with, e.g., (aminomethyl)phosphonic acid, aspartic acid, tetraethylenepentamine, n-(2-acetamido)iminodiacetic acid, iminodiacetic acid, 4-phenyl-3-thiosemicarbazide, 4-methylthiosemicarbazide, etc. The reaction conditions are designed following the normal practice of those skilled in the art.

In some embodiments, additives such as inorganic nanomaterials, carbonaceous nanomaterials, metal or ceramic powders, small organic molecules, dyes, plasticizers, emulsifiers, and/or surfactants may be incorporated into the electrospinning/electrospraying feed solution to alter the properties of the resultant fibers/particles. The weight percent of a certain additive in the polymer varies by the type of additive and intended product application from greater than 0 wt. % to about 95 wt. %, for example the amount of additive may be any value within this range (e.g., about 1 wt. %, about 10 wt. %, about 25%, about 50 wt. %, about 70 wt. %).

In one embodiment, luminescent fibers (e.g., fluorescent, phosphorescent) may be prepared by adding a luminescent complex, such as a dye, metal complex or a metal salt into the electrospinning feed solution. Applications for luminescent nanofibers may include but are not limited to: smart clothing, energy harvesting, energy storage, communication, safe data storage, nanoscale light sources, waveguides, LEDs and lasing devices high-end sensors, scintillators, catalysts. Dyes utilized include, but are not limited to, fluorescent dyes (e.g., fluoresceins (fluorescein, dibromofluorescein, diiodofluorescein), coumarins (coumarin 334 ($C_{17}H_{17}NO_3$), coumarin 6 ($C_{20}H_{18}N_2O_2S$)), indole dyes (e.g., 1,3-dihydro-8-methoxy-1,3,3-trimethyl-6-nitrospiro [2H-1-benzopyran-2,2-(2H)-indole]), and/or oxazine dyes (e.g., 1,3-dihydro-1,3,3-trimethylspiro [2H indole-2,3-[3H] phenanthr [9,10-b] (1,4) oxazine]).

In one embodiment, the product is a photo-switchable nanofiber mat which comprises the following: poly(norbornene-2-methanol) fiber mat with thickness between 5 and 50 μm (average fiber diameter between 100 and 500 nm) containing between 0.05 to 2 wt. % of 1,3-dihydro-8-methoxy-1,3,3-trimethyl-6-nitrospiro[2H-1-benzopyran-2, 2-(2H)-indole] uniformly disperse within the fibers. The mats exhibit fluorescence when irradiated with UV light with maximum emission intensity at ~450 nm which deteriorates after irradiation with visible light. The mats may be useful for applications in optical data storage, watermarking (anti-counterfeiting), sensing, etc.

In one embodiment, piezoelectric fibers may be prepared by adding piezoelectric nano- or microparticles into the electrospinning feed solution, for example barium titanate ($BaTiO_3$), lead zirconate titanate (PZT), sodium niobite ($NaNbO_3$), zinc oxide (ZnO). The composite fibers may be formed using monomers polymerizable by ROMP to form the polymer matrix. For example, the matrix may contain fluorinated polynorbornene derivatives (such as poly(5-(perfluorohexyl)norbornene), polynorbornenes with polar size groups (such as poly(trans-5-norbornene-2,3-dicarboxilic acid), etc. The surface of piezoelectric materials may be chemically modified prior to incorporation into the electrospinning feed solution (e.g., by attaching functional silane molecules) to improve dispersion of the particles within the polymer matrix. The piezoelectric coefficient ($d_{33}$) (defined as the volume change of a piezoelectric material under an electric field, or the polarization under mechanical deformation) of the composite fibers increases with the relative wt. % increase of piezoelectric additive to the polymer. For example, poly(5-(perfluorohexyl)norbornene) fibers (average diameter of 850±170 nm) with 50 wt. % of PZT may exhibit $d_{33}$ of equal or greater than 4 pC/N at applied voltage of 20 kV and polarization time of 30 min (measured using a $d_{33}$ meter). The piezoelectric composite fibers may be used for energy harvesting and sensing applications.

In one embodiment, materials that absorb radiation, e.g., containing boron compounds (e.g., boron nanopowder, boron carbide, boron nitride, hexagonal-boron nitride, boric acid), bismuth compounds (e.g., bismuth oxide), wolfram carbide, gadolinium, etc., may be added to the electrospinning feed solution to obtain fibers for radiation hardening and shielding from alpha/p and neutron particle emissions, X-ray or gamma-ray electromagnetic radiation. Polymer matrix preferably includes poly(dicyclopentadiene) and can be made from other monomers polymerizable by ROMP (including but not limited to norbornene and substituted norbornene monomers). The surface of additive materials may be chemically modified prior to incorporation into the electrospinning feed solution (e.g., by attaching functional silane molecules) to improve dispersion of the particles within the polymer matrix. The relative wt. % of the additive to the polymer is preferably greater or equal to about 30 wt. %. For example, to obtain fibers that absorb neutron radiation, the additives may comprise materials such as LiF and $B_4C$. The fibers may be used for radiation hardening of electronic components, as part pf personal protection equipment, etc.

In some embodiments, core-shell (core-sheath) fibers can be produced by using a coaxial (or triaxial) tip. See FIG. 3. In coaxial electrospinning, the tip consists of two nozzles (inner and outer) aligned concentrically, through which the core and shell solutions are fed at certain flow rates (can be the same for the inner and outer solution or different). See FIG. 3. If the outermost shell liquid has properties that do not allow for sufficient molecular entanglement (e.g., low viscosity), electrospraying occurs, which results in deposition of core-shell particles onto the collector. The benefit of core-shell structure is in ability to achieve multifunctional properties, for example, mechanical reinforcement combined with element-capture ability; elasticity combined with luminescence; specific wettability combined with electrical conductivity, encapsulation of chemicals for controlled release, encapsulation of self-healing agents, etc. The core and sheath may be made of any combination of materials. Normally non-electrospinnable materials (e.g., amorphous polytetrafluoroethylene (PTFE), polyaniline, polypyrrole, mineral oil, solutions containing salts, etc.) can be electrospun as a core in combination with an electrospinnable shell material (and vice versa). Additional modifications of the process using "nonspinnable" shell solution include using gas or non-electrospinnable liquid such as pure solvent, which are fed though outer nozzle of the coaxial tip, to obtain single layer fibers with improved morphology (for example, continuous smooth fibers). The fibers with varying diameters may be produced by varying the feed solution and operating parameters as described above. The core-sheath dimensional ratio may be controlled by varying the respective feed solution properties and flow rates. At least one layer or every layer of a fiber may be made of ROMP-type polymer produced by the method disclosed herein. For example, fibers containing pDCPD core and pNBDAC-co-pDCPD shell may be produced as follows: electrospinning at applied voltage of 10 kV, distance to the collector 10 cm, feed solution for core comprising DCPD monomer (4 parts by volume) in DCM (1 part by volume) and Grubbs' $2^{nd}$ generation catalyst (molar ratio of DCPD to catalyst 15,000:1) mixed for 20 s supplied at flow rate of 0.2 mL/min; feed solution for shell containing neat NBDAC (3 parts by volume), 5 M DCPD in DCM (2 parts by volume), and DCM (2 parts by volume) with Grubbs' $2^{nd}$ generation catalyst (molar ratio of the monomers to catalyst 15,000:1) mixed for 30 s and supplied at low rate of 1 mL/min. At these conditions, fibers with overall diameter of about 740±50 nm (about 500 nm core and about 200 nm shell) may be obtained. These fibers nay be used for immobilized reagent cartridges for in-line diversification or purification (i.e., scavengers) for application in combinatorial chemistry, facilitated synthetic protocols, multi-well plates. The fibers may be further modified by the procedure described above for selective binding of chemical species (e.g., via immersion into water to convert acyl chloride groups in the shell layer to carboxylic acid for metal ion chelation) for applications in chromatography, micro-solid phase extraction sorbents, environmental remediation (e.g., removing toxic metals from aquafers), ion exchange membranes, etc.

Hollow fibers may be further produced by dissolving the core in core-shell fibers prepared with a sacrificial polymer or solvent (e.g., heavy mineral oil) core. Hollow fibers present competitive advantages for use in membrane applications due to their mechanically self-supporting characteristics which 1) eliminate the need for spacers, 2) allow for denser packing and higher effective membrane surface area. See FIG. 3. For example, hollow $pNBC_6F_{13}$ fibers may be produced as follows: electrospinning at applied voltage of 16-20 kV, distance to the collector 5 cm, flow rate 0.5 mL/min (both core and shell solutions), the core solution is comprised of silicon oil, the shell solution contains neat $NBC_6F_{13}$ monomer (7 parts by volume) and dichloroethane (2 parts by volume) with $2^{nd}$ generation Grubbs' catalyst (monomer to catalyst ratio 10,000:1) mixed for 15 s. After electrospinning, the silicon oil may be extracted from the fibers by immersing the fibers into n-hexane solution for 12 h. At the described conditions, $pNBC_6F_{13}$ hollow fibers with average overall diameter of 5.1 μm±0.5 μm may be obtained with the shell thickness of about 1.5 μm. Other dimensional configurations are possible by varying the feed solution and process parameters. The $pNBC_6F_{13}$ hollow fibers may be used, for example, as cable cladding or prepared into porous mats to serve as membranes for chemical separations.

Porous fibers/particles can be produced by mixing the monomer in a solvent that is poor for the resulting polymer (i.e., non-solvent), which leads to chemically induced separation upon polymerization. This results in a porous polymer fiber/particle structure upon removal of the solvent (porosity of less than 10%, or between 5% and 20%, or between 10% and 30%, or between 20% and 60%, or up to 90% can be achieved by varying the amount of the non-solvent added to monomer solution). Examples of suitable solutions/monomers include but are not limited to: norbornene diacyl chloride and THF; dicyclopentadiene (DCPD) and 2-propanol; fluorinated norbornene monomers and toluene. In some embodiments, the ratio of solvent to monomer may be any value less than or equal to 45% by weight, e.g., about 5% by weight, about 15% by weight, from about 14 to about 30% by weight, from about 30 to about 45% by weight.

In some embodiments of polymer fibers/particles may be subjected to additional processing steps of: thermal annealing, chemical etching, UV light exposure, ion-track etching, exposure to oxygen plasma, e-beam evaporation, chemical vapor deposition (CVD), metal organic chemical vapor deposition (MOCVD), physical vapor deposition (PVD), atomic layer deposition (ALD), spray-coating, sputtering, modification via non-covalent interactions (e.g., self-assembly monolayers, layer-by-layer deposition) or modified by any combination of thereof.

In some embodiments, polymer fiber mats or 3D structures (where z-dimension the same order of magnitude as x- and y-dimensions) may be produced. Fiber mats and 3D structures may be porous, wherein the mean "pore" size is approximately linearly proportional to the fiber diameter, and the porosity (i.e., the measurement of the void space in the material) is relatively independent of the fiber diameter.

Mats and 3D structures may have porosity in the range of 30-50%, or 80-90%, or above 20%, or between 50 and 90%, or below 30%. Other ranges are also possible. Porosity can be determined using the following equation: Porosity=(1−$\rho_{app}/\rho_{bulk}$)×100%, where $\rho_{app}$ is the apparent density of the mat/3D structure and $\rho_{bulk}$ is the bulk density of polymer comprising the fibers. The $\rho_{app}$ may be determined gravimetrically as $\rho_{app}$=m/V, where m is the mass of a mat/3D structure and V is the volume of the structure (V=thickness× area). Fiber mats may have any thickness suitable for a specific application. In some embodiments, the mat thickness may be <1 μm, or between 1 μm and 10 μm, or between 5 μm and 25 μm, or between 20 μm and 100 μm, or between 100 μm and 600 μm or <1500 μm. The thickness may be determined according the standard procedure ASTM D1777.

Mean pore size of the mats and 3D structures may vary. Mean pore size (may be determined according to ASTM F316-03 standard) may be from 100 nm to 500 nm, or less than 100 nm, or between 500 nm and 1 μm, or between 1 μm and 10 μm or less than or equal to about 30 μm.

The mass per area (mass/area) of the mats and 3D structures may also vary. The mass/area of the mat is calculated by measuring the mass of a well-defined area of the sample using a scale. The sample is cut to a defined area using a die or any precise cutting instrument. Depending on the porosity, number of layers, additives, etc. the mass/area may be between 0.01 $g/m^2$ and 0.025 $g/m^2$, or between 0.02 $g/m^2$ and 0.1 $g/m^2$, or between 0.5 $g/m^2$ and 5 $g/m^2$, less than or equal to 25 $g/m^2$, or between 10 $g/m^2$ and 50 $g/m^2$, or greater than about 50 $g/m^2$, or less than or equal to 150 $g/m^2$.

In some embodiments, multilayer mats (e.g., having at least 2 layers, or may have 3, 4, 5, 10, 20 or more layers) can be produced. If 2 or more separate tips with different feed solutions are used in the electrospinning setup, fiber products with mixed fibers from different polymers may be made. Multilayer or mixed fiber mats may combine the properties of the polymers they contain. A multilayer mat may comprise a nanofiber layer adhered or otherwise bonded to another ("backing") layer (polymer fiber layer and/or non-porous polymer layer and/or porous polymer layer made of a single polymer and/or polymer blend and/or polymer melt). The "backing" layer can be single-phase or multi-phase. In some embodiments, two or more layers of the same composition (e.g., the same polymer fiber type, the same fiber size, etc.) may be stacked together to form a homogeneous mat across its thickness.

Figure 4:
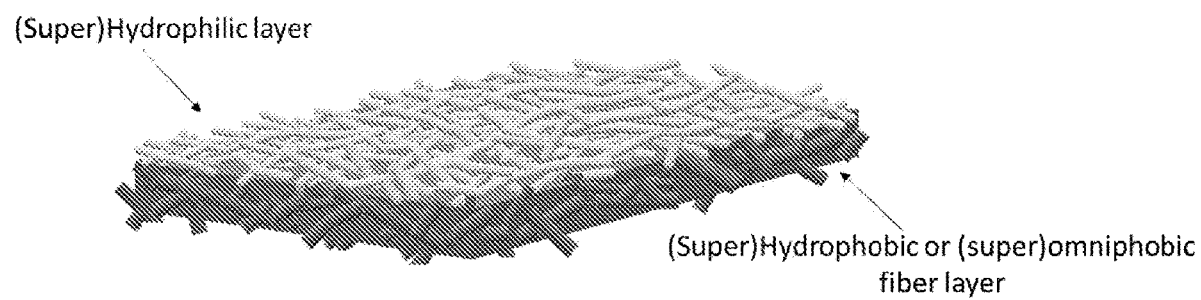
FIG. 4 illustrates a multilayer mat, in accordance with an example embodiment of the disclosure.

One embodiment of a multilayer mat is a double-layer mat, where the top layer is (super)hydrophilic and the bottom layer is (super)omniphobic or (super)hydrophobic. See FIG. 4. A hydrophilic and a superhydrophilic surface exhibit water contact angles at the surface lower than 90° and 10°, respectively. A hydrophobic and a superhydrophobic surface have water contact angles of more than 90° and more than 150°, respectively. Omniphobic and superomniphobic surfaces have contact angles of >90° and >150°, respectively, with both high and low surface tension liquids, including water, oils and alcohols. The two layers may be stacked, laminated, adhered, fused, etc. on top of each other. The double-layer mat described herein is particularly useful as a composite membrane for membrane distillation that may simultaneously exhibit anti-wetting and anti-fouling properties. The fibers forming each layer of the membrane may be derived from the same polymer, from different polymers, or a combination thereof. The polymer fibers can have an average diameter of from about 50 nm to about 200 nm, from about 100 nm to about 500 nm, from about 300 nm to about 2 µm, from about 1 µm to about 20 µm, from about 10 µm to about 200 µm. The fibers forming each layer may contain inorganic or carbonaceous additives, in the range of about 0.1% by weight to about 70% by weight. Fibers in each layer independently of the other layer may comprise non-woven structure, aligned structure, woven structure, netted structure, etc. The fibers in the top (super)hydrophilic layer may overlap to form a non-porous structure or comprise a plurality of pores. Instead of electrospun fibers, the top hydrophilic layer may be comprised of electrosprayed polymer particles of the perimeter of from about 10 nm to about 10 µm. The bottom layer comprises a plurality of pores. Each of the layers may have a mass/area from about 0.025 g/m$^2$ to about 30 g/m$^2$, from about 0.05 g/m$^2$ to about 15 g/m$^2$, from about 0.1 g/m$^2$ to about 10 g/m$^2$, from about 0.1 g/m$^2$ to about 7 g/m$^2$ from about 0.1 g/m$^2$ to about 5 g/m$^2$, or from about 5 g/m$^2$ to about 25 g/m$^2$. The top (super) hydrophilic layer is made of a polymer that may contain (inherently or as a result of surface modification) polar functional groups and/or functional groups bearing an electric charge, including but not limited to hydroxyl, amine, carboxylic acid, phosphonic acid, sulphonic acid, quaternary ammonium, sulfobetaine, etc., for example the following polymers: poly(5-norbornene-2-carboxylic acid), poly(5-norbornene-2-endo,3-exo-dicarboxylic acid), poly(5-norbornene-2-methanol), poly(5-norbornene-endo-acetic acid), poly(sulfobetaine methacrylates) (such as poly[2-(methacryloyloxy)ethyl]dimethyl(3-sulfopropyl)ammonium hydroxide), poly(4-styrenesulfonic acid), poly(vinyl alcohol), poly(ethylene glycol). The thickness of the hydrophilic layer is preferably <10 µm, and more preferably <1 µm, if it is porous. The thickness of the hydrophilic layer is preferably <500 nm if it is non-porous. The hydrophilic layer may exhibit an in-air sessile drop contact angle with water of <50° and preferably <10°. The thickness of the second (super)hydrophobic or (super)omniphobic layer is preferably <600 µm. The (super)omniphobic or (super)hydrophobic exhibit an in-air sessile drop contact angle with water of >90° and preferably >110°. The (super)omniphobic layer may exhibit an in-air sessile drop contact angle with hexadecane of >50°. The (super)omniphobic layer may be comprised of polymers containing fluorinated groups, for example fluorinated norbornene derivativities such as 5-(perfluoro-n-alkyl) norbornenes. The double layer membrane retains its mechanical properties and chemical stability at temperatures of higher or equal to 60° C. and/or below 200° C.

Figure 5:
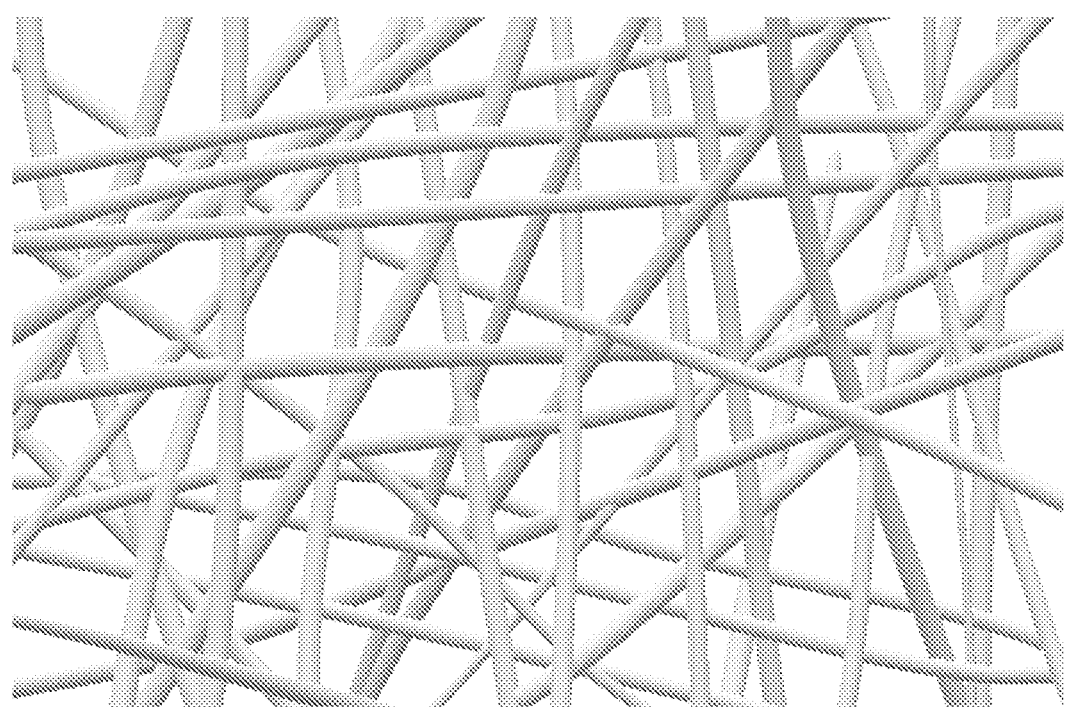
FIG. 5 illustrates magnified schematic structure of a nonwoven nanofiber mat, in accordance with an example embodiment of the disclosure.

FIG. 5 depicts a magnified schematic structure of a nonwoven nanofiber mat. These mats may include a variety of polymer fibers that have a variety of applications. In one embodiment, the mat is an anti-biofilm, anti-icing, low friction, nanofiber mat containing fluorine functional groups. The mat may comprise a plurality of pores with the average pore size of <50 nm or from 50 to 300 nm or from 100 nm to 500 nm or <1.5 µm. The thickness of the mat may be from about 500 nm to about 2 µm or from about 1 µm to about 7 µm or from about 5 µm to about 25 µm or from about 20 µm to about 100 µm or <500 µm. The pores of the mat may be optionally infused with a lubricating fluid with the properties complementary to the surface chemistry of the mat, such that the liquid spreads spontaneously into the pores and is retained through intermolecular interactions between the solid surface and the liquid (e.g., hydrogen bonding, electrostatic interactions, hydrophobic interactions, etc.). The lubricating fluid may contain perfluoropolyethers, perfluorotripentylamine, and perfluorodecalin. The mat is preferably flexible. Optional backing layer comprising an organic/inorganic/ceramic film, membrane, composite panel. Nanofibers are deposited directly onto the backing layer during electrospinning. The mat may be laminated, heat bonded, adhered, welded, or otherwise attached to a metal, polymer, composite surface, etc.

In one embodiment, a 63±10 µm pNBC$_6$F$_{13}$ nanofiber layer may be spun onto on a 75 µm-thick thermoplastic polytetrafluoroethylene (PTFE) film. The average diameter of the nanofibers may be 320±100 nm. Nanofibers form a layer with a plurality of pores, average pore size ≥150 nm. The pores of the mat may be optionally infused with perfluoropolymer lubricant (e.g., Krytox 100, DuPont). Electrospinning of nanofibers onto thin insulating substrates may be accomplished by layering the substrate on top of a grounded conductive substrate (e.g., metal plate or foil, a silicon or quartz substrate with a metal electrode patterned on top of the surface by, for example, physical vapor deposition (electrode may, for example, be comprised of about 100 nm thick layer of Ag on top of a thin (e.g., from about 10 to about 20 nm thick) layer of Cr to ensure adhesion of Ag to the substrate). Specifically aligned and patterned fiber structures may be obtained using patterned electrodes.

In one embodiment, nonwoven or aligned fiber mat comprised of insulating (electrically non-conductive) nano- or microfibers and plurality of pores may serve as a battery separator to prevent a short circuit between the battery electrodes while providing effective electrolyte ion transfer within the cell. The separator mat may be a single layer or a multilayer fiber mat comprised of polymer fibers prepared according to the method disclosed herein. The separator thickness is preferably lesser or equal to 40 µm, for example from 6 to 12 µm or from 10 to 25 µm, or any value from 1 to 40 µm. The porosity of the separator should provide sufficient ionic conductivity while ensuring structural integrity and may be within the range of from about 5% to about 90% (the use of a separator with porosity of less than 5% may increase the resistance of the cell, while separators with porosity of over 90% may have weakened mechanical properties). The average pore size of the separator mat may range from about 0.01 µm to about 5 µm, for example, from 0.05 µm to 0.1 µm or from 0.5 µm to 1 µm. The average diameter of fibers comprising the separator may be within the rage of from about 50 nm to about 2 µm, for example between 200 and 300 nm or between 150 nm and 500 nm. The separator should exhibit sufficient thermal stability. For example, the separator may maintain dimensional stability (not shrink, melt or deform) and structural integrity (not break or rupture) at temperatures of 120° C. or more. The tensile strength of the separator mat is preferably greater or equal to 10 MPa and puncturing strength of greater or equal to 12 g per 1 µm of separator thickness. The separator may be comprised of fibers from the ROMP-type polymers and their copolymers, for example the following: poly(dicyclopentadiene), fluorinated polynorbornenes, e.g., poly(5-(perfluorohexyl)norbornene), poly(5-norbornene-2-carboxylic acid), poly(5-norbornene-2-endo,3-exo-disufonic acid), poly(5-norbornene-2-methanol), etc.

Other applications of fiber mats and 3D structures described herein include, but are not limited to, membranes for membrane distillation, micro- and ultrafiltration membranes; ion exchange membranes; proton conducting membranes; anion conducting membranes; affinity chromatography media; media for vibration/acoustic damping; fibers for sorption of organic and bio-molecules and gasses; and/or performance textiles.

In some embodiments, fiber mats and 3D structures described herein may be a component or a part of a larger filtration device or system.

Figure 6:
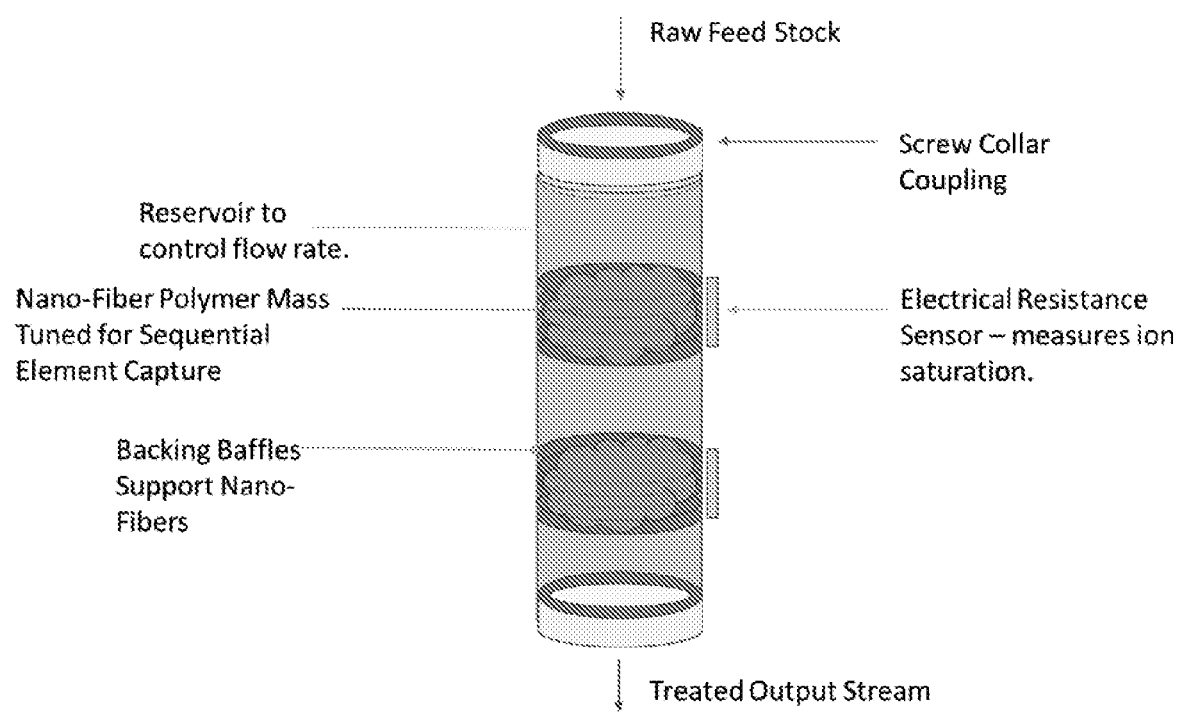
FIG. 6 illustrates a cartridge containing nano- or microfiber sections tuned for capture of various elements, in accordance with an example embodiment of the disclosure.

In one embodiment, a cartridge containing one or more nanofiber sections tuned for capture of various elements may be made. See FIG. 6. Specifically, the cartridge may include a polymer fiber mat or 3D structure tuned for element capture (may be sequential if more than one element is to be captured). The cartridge may be comprised of sections that couple to each other (e.g., via a screw collar). The average diameter of the fibers within the fiber mass is preferably lower than or equal to 1 μm. The fiber mats may be overlayed (or laminated, etc.) onto a commercial micro- or ultrafiltration membrane (or other backing baffle material). The fiber 3D structures may be supported by fibers with larger diameter (e.g., 10 μm or more) made of non-element binding material (e.g., high density polyethylene, fluorinated polymers, inorganic fibers). The composite fiber mats or 3D structures may be supported within the cartridge with backing baffles. An electrical resistance (or impedance) sensor to measure the ion saturation may also be included. The cartridge may have an input where raw feed stock enters and an output for the treated output stream as well as a coupling (such as a screw collar) where the cartridge may be attached to a larger system. The cartridge may contain a reservoir to control flow arte and fluid can be moved through the cartridge according to any suitable method. For example, in one embodiment, the fluid can be pumped through the cartridge under pressure, or is moved through the cartridge based on gravity force, or other methods generally known in the art. Flow rate may be controlled by a reservoir or other means, and more than one stage (more than one fiber section of the same or different chemical composition) may be included. The fluid may be recirculated repeatedly in one or more selected sections only or through the entire cartridge.

As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "etc.", "e.g.," and "for example" set off lists of one or more non-limiting examples, instances, or illustrations.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method of producing polymer fibers or particles by electrospinning and in situ polymerization of monomers using an electrospinning setup equipped with a microfluidic mixing system comprising:
   a high voltage power supply;
   an electrically grounded collector;
   an electrospinning tip serving as a positive electrode;
   a monomer solution comprising a monomer and a separate catalyst solution comprising a catalyst, wherein said monomer solution and said catalyst solution are contained in separate syringe pumps; and
   a microfluidic mixing chamber, where the monomer solution and the catalyst solution are mixed to create one combined solution; wherein said in situ polymerization of monomers comprises the following:
   mixing the monomer solution and the catalyst solution in a microfluidic mixing chamber to create one combined solution;
   sending the combined solution into the electrospinning tip;
   applying voltage to the electrospinning tip via said high voltage power supply;
   ejecting a charged jet from the electrospinning tip toward the collector;
   polymerizing said combined solution via in situ polymerization en route to the collector; and
   depositing polymer fibers or particles onto the collector.

2. The method of claim 1, wherein said in situ polymerization is carried out via ring-opening metathesis polymerization (ROMP).

3. The method of claim 1, wherein said catalyst in said catalyst solution has the following structure (II):

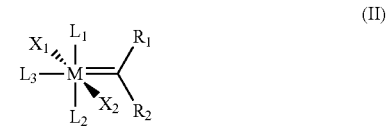

where: M is a metal, selected from ruthenium or osmium;
$R_1$ and $R_2$ are each independently selected from the group consisting of H, $C_{1-20}$ alkyl, $C_{2-20}$ alkenyl, $C_{2-20}$ alkynyl, aryl, $C_{1-20}$ carboxylate, $C_{1-20}$ alkoxy, $C_{2-20}$ alkenyloxy, $C_{2-20}$ alkynyloxy, aryloxy, $C_{2-20}$ alkoxycarbonyl, $C_{1-20}$ alkylthio, $C_{1-20}$ alkylsulfonyl, $C_{1-20}$ alkylsulfinyl and silyl, which is optionally further substituted;
$X_1$ and $X_2$ each represent an anionic ligand; and
$L_1$, $L_2$ and $L_3$ each represent a neutral electron donor ligand.

4. The method of claim 3, wherein $X_1$ and $X_2$ are each independently halogen, SH, COOH, OH, CN, $OCH_3$, or $CF_3$.

5. The method of claim 3, wherein $L_1$, $L_2$ and $L_3$ are each independently tricyclohexylphosphine ($PCy_3$), 1,3-bis(2,4,6-trimethylphenyl)-1,3-dihydro-2H-imidazol-2-ylidene (IMes) or 1,3-bis(2,4,6-trimethylphenyl)-4,5-dihydroimidazol-2-ylidene (SIMes), which is optionally further substituted.

6. The method of claim 3, wherein at least one of $L_1$, $L_2$ or $L_3$ is a heterocyclic carbene ligand.

7. The method of claim 1, where said catalyst is dissolved in an organic solvent to create said catalyst solution.

8. The method of claim 7, where the organic solvent is toluene, dichloromethane (DCM), or tetrahydrofuran (THF).

9. The method of claim 1, wherein said polymer fibers or particles comprise poly(dicyclopentadiene), poly(norbornene), or derivatives or co-polymers thereof.

10. The method of claim 9, wherein said polymer fibers or particles are poly(trans-5-norbornene-2,3-dicarbonyl chloride) (pNBDAC); poly(dicyclopentadiene) (pDCPD); or poly(dyciclopentadiene)-co-poly(trans-5-norbornene-2,3-dicarbonyl chloride) (pDCPD-co-pNBDAC).

11. The method of claim 1, further comprising modifying said polymer fibers or particles after said in situ polymerization.

12. The method of claim 11, wherein said modifying said polymer fibers or particles after said in situ polymerization results in production of fluorinated polynorbornene derivatives; poly(5-norbornene-2-carboxylic acid), poly(5-norbornene-2-hydroxamic acid), or poly(5-norbornene-2-endo, 3-exo-disufonic acid).

13. The method of claim 1, where extent of polymerization is determined by time of mixing in the microfluidic mixing chamber.

14. The method of claim 13, where the time of mixing is between 1 sec and 60 sec.

15. The method of claim 1, where a catalyst to monomer molar ratio in the combined solution is between 50,000:1 and 5,000:1.

16. The method of claim 15, where the catalyst to monomer molar ratio in the combined solution is between 15,000:1 and 10,000:1.

17. The method of claim 1, where a monomer concentration in the monomer solution is from about 0.1 M to 5 M.

18. The method of claim 17, where the monomer concentration in the monomer solution is from about 1 M to 5 M.

19. The method of claim 1, where the combined solution has a solution viscosity of 8 to 15 Pa·s at room temperature (25° C.).

20. The method of claim 1, where the combined solution has a solution viscosity of 15 to 60 Pa·s at room temperature (25° C.).

* * * * *